Sept. 11, 1945.   J. MANCIA ET AL   2,384,759
BELT DRIVE DEVICE
Filed March 17, 1944   3 Sheets-Sheet 1
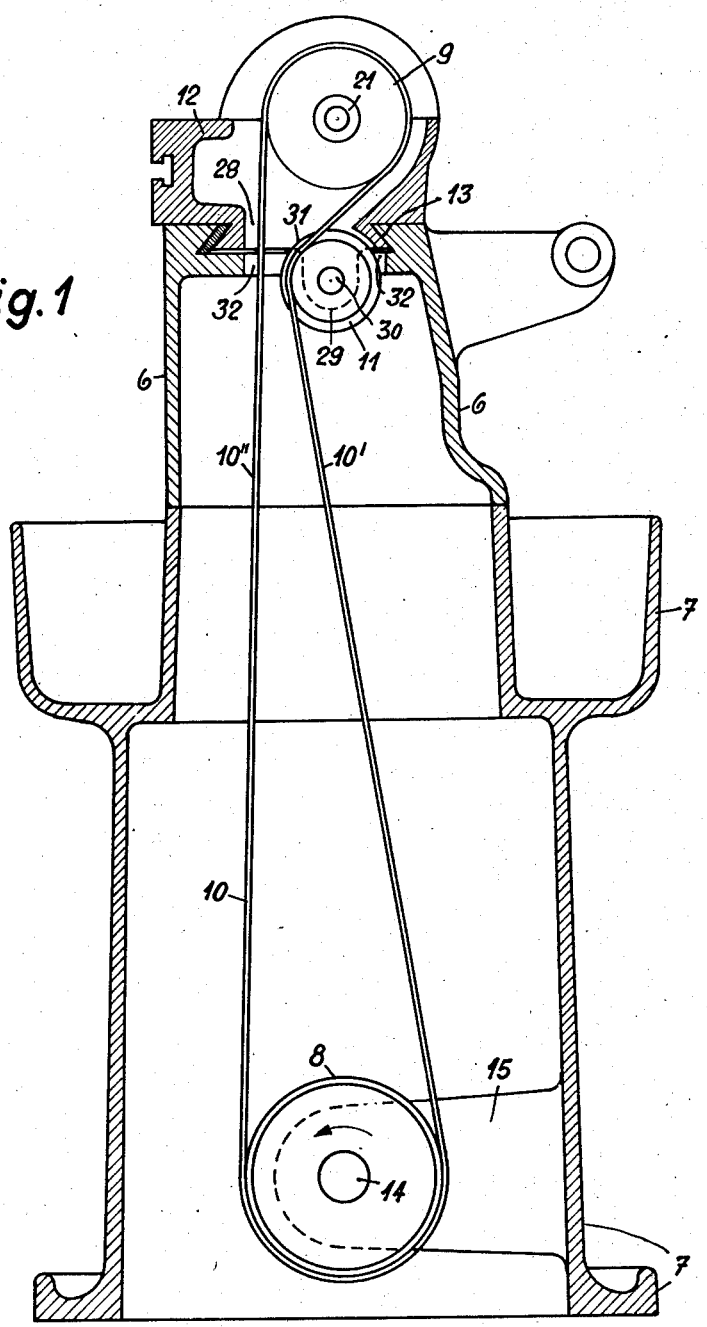
INVENTORS:
J. MANCIA and G. MÉGEL
By E. F. Wenderoth
ATTORNEY

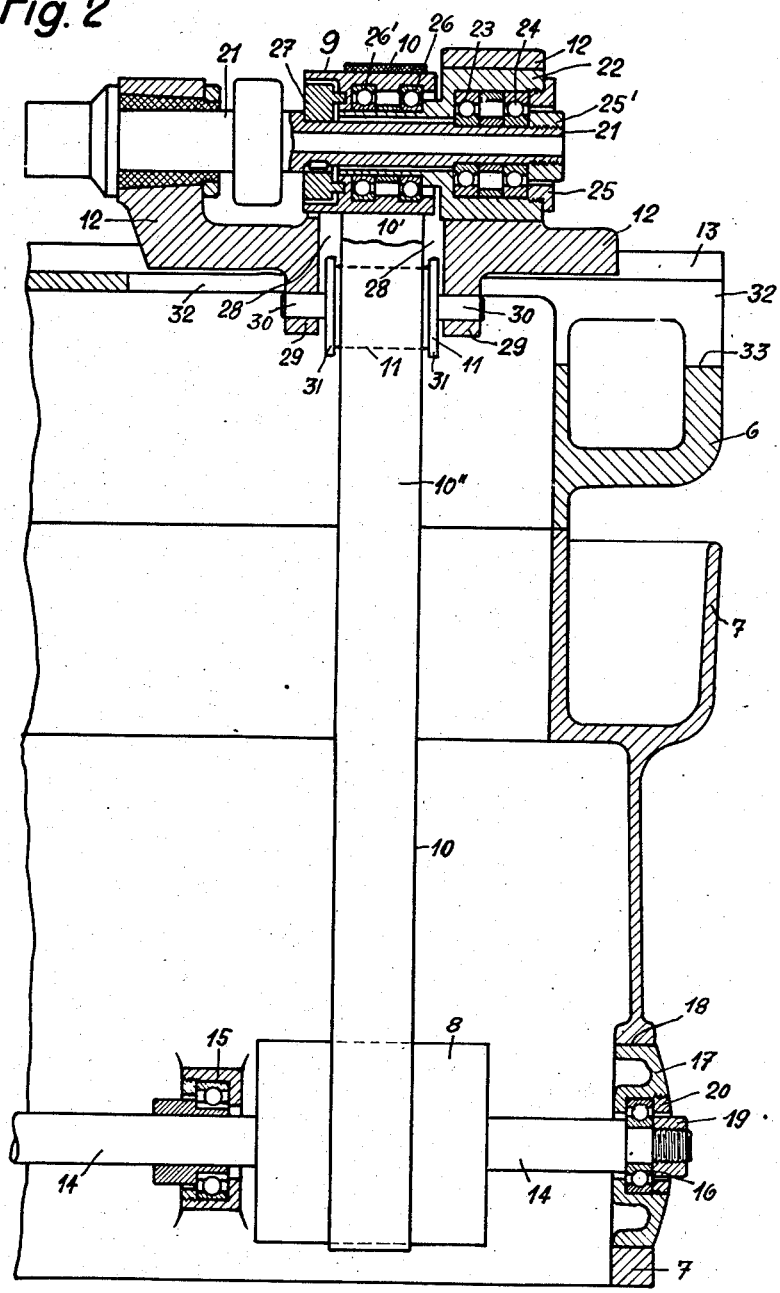

INVENTORS:
J. MANCIA and G. MÉGEL
By E. F. Wenderoth
ATTORNEY

Patented Sept. 11, 1945

2,384,759

UNITED STATES PATENT OFFICE 2,384,759

BELT DRIVE DEVICE

Jacques Mancia and Georges Mégel, Moutier, Switzerland, assignors of one-half to Usines Tornos Fabrique De Machines Moutier S. A., Moutier, Switzerland Application March 17, 1944, Serial No. 526,958
In Switzerland February 9, 1943

4 Claims. (Cl. 74—219)

The present invention relates to a belt drive device for driving a shaft located in a movable slide-member, for instance the movable spindle of a lathe or an automatic slicing lathe, of the kind in which a driving pulley drives a driven pulley by means of an endless drive belt the two sections of which pass through a single aperture provided in the slide-member.

In order to realize a good drive and an irreproachable operation of the slide-member, it is of importance in the hitherto known devices of this kind in which the driven pulley participates in the shifting motion of the slide-member, that the driven pulley has a relatively large diameter and is driven by means of an endless belt, if possible without any belt-fastenings or claw belt fastener, this condition being indispensable in order to prevent a detrimental trembling and floating of the belt.

Hence, it is preferred to use braided belts or leather belts with a cemented joint in lathes and automatic machine tools of high accuracy designed for slicing, forming or working small parts such as parts of time pieces, but the use of such a belt involves either the provision of two apertures for the passage of the belt, one of which is located in the slide-member and the other outside of said member (Fig. 4), or a single aperture provided in the slide-member for the passage of the two sections of the drive belt (Fig. 5).

In the first instance (Fig. 4) it is impossible to use on the pulleys an endless braided belt or a leather belt with cemented joint without having first to open it and, putting it back in place, to connect it again.

In the second instance (Fig. 5) it is easy to put the belt in place on the pulleys and to remove it, but when the driven pulley has a relatively great diameter, an excessive size is required for the single aperture of the slide-member such that said member must be too large in comparison to its length and above all would have an insufficient guide. When using a driven pulley of small diameter, the width of the slide-member would remain normal, but the pull would be insufficient.

It is an object of the present invention to realize a new simple and rational solution of the problem of drive by an endless belt.

The drive according to the present invention comprises in combination a slide-black or a similar slide-member as for instance a loose head stock provided with a deflecting pulley having guide-flanges and over which passes one of the sections of the endless belt, preferably the driven belt section.

This device can be employed especially but not exclusively in automatic slicing lathes in order to assure a perfect guiding of the loose head stock and preferably by means of an endless belt, braided or with cemented joint, a perfectly maintained and regular pull in the drive of the head stock spindle. Said device can be arranged such that the belt can easily be put on the pulleys or removed therefrom.

An embodiment of the device according to the present invention as applied to an automatic slicing lathe is illustrated by way of example in the accompanying drawings.

Fig. 1 shows more or less schematically a transverse section of said lathe.

Fig. 2 is an elevation, partially in section along the shaft or the rotary spindle of the lathe.

Figure 3:
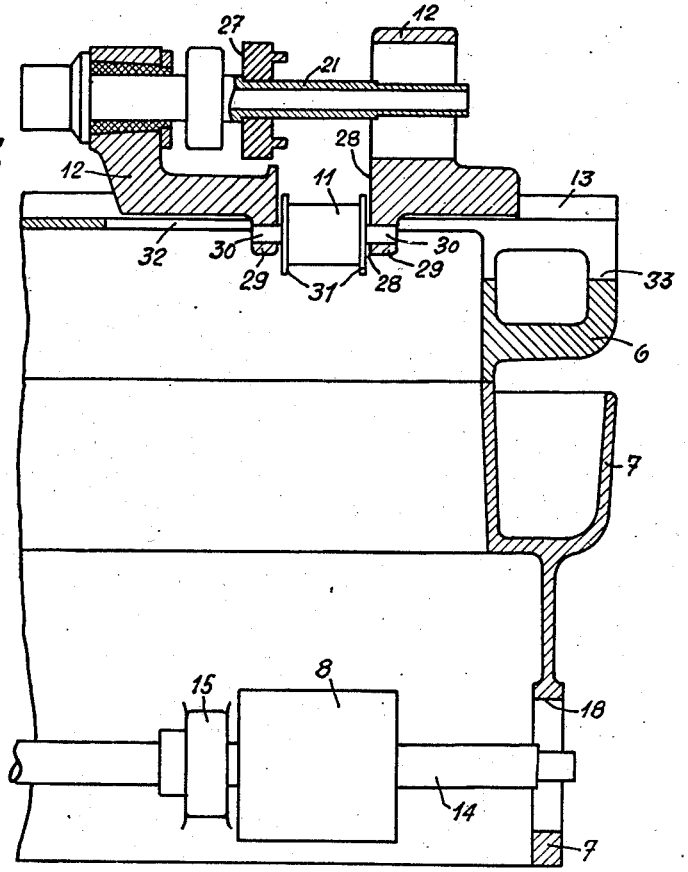
Fig. 3 is a section similar to the foregoing figure, but without the driving belt, the driven pulley and certain bearings, this figure being intentionally drawn on a smaller scale in comparison with the preceding figures.

Referring now to Figs. 1 to 3 of the drawings, the lathe illustrated therein comprises the frame 6 with its oil tank body 7, the driving pulley 8, the driven pulley 9, the endless driving belt 10, the deflecting pulley 11 and the movable head stock 12 shiftingly movable in a dovetailed slide bar 13 of the lathe bed.

The driving pulley 8 is keyed onto a driving shaft 14 journalled in two bearings 15 and 16 respectively (Fig. 2) provided with ball bearings. The bearing 15 constituted by an extension of the frame 7 is immovable in the latter. The bearing 16 supporting the back end of said shaft 14 comprises a disc 17 removably fitted in a circular aperture 18 arranged in the wall of the frame 7. Said disc 17 is secured in place conjointly with the ball bearing and the shaft 14 by means of two nuts 19 and 20 one of which is screwed onto the end of said shaft and the other into the disc 17.

The pulley 8 rotates in the direction indicated by an arrow in Fig. 1 and drives the pulley 9 loosely fitted on a bush constituting an extension of a fixed bushing 22 removably fitted in a bore of the head stock 12. In the tubular bushing 22 is fitted the hollow shaft 21, constituting the spindle of the head stock 12, by means of a set of ball bearings 23 and 24 secured in place by two nuts 25 and 25', said hollow shaft being freely located in the bushing of the bearing.

As a modification, the bushing supporting the pulley 9 could be fastened axially in overhanging relation directly on the body of the movable head stock.

The pulley 9 has no guide flanges; it is fitted so as to freely rotate on the bush of the tubular bushing 22 through the medium of a set of ball bearings 26, 26', but it drives only indirectly the shaft 21 by means of a pin disc 27 keyed onto said shaft and the pins of which engage corresponding holes in the pulley. The two sections of the driving belt pass through a single aperture 28 located in the bottom of the head stock, comprising a dovetailed slide-block and having two lugs 29 supporting the axle 30 of the deflecting pulley 11 provided with flanges 31.

Figure 4:
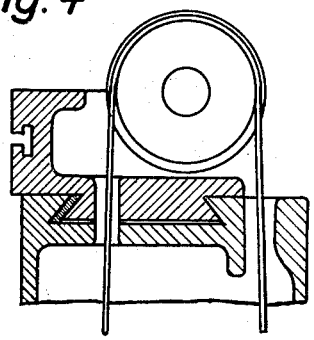
Figs. 4 and 5 illustrate, for the sake of documentation, sections of the two known devices mentioned in the preface.
Figure 5:
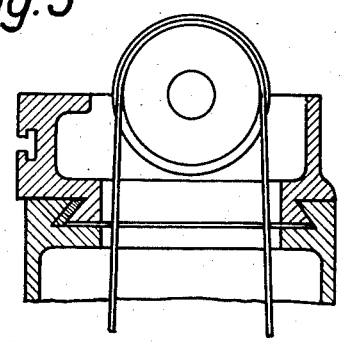

Over this pulley 11 runs the driven section 10' of the drive belt 10 in order to deflect said section in a direction toward the driving section 10". As a result, the two sections of the belt are approached to one another and hence require only a relatively restricted aperture in order to pass through the bottom of the head stock and its bed. Said bed is constituted by the upper part of the frame 6 and comprises the slide bar 13 for the slide-block of the head stock; it comprises a longitudinal aperture 32 and at the end of the latter a recess 33 which makes it possible to remove the head stock together with its deflecting pulley 11 from the frame. By virtue of its flanges, said deflecting pulley guides easily the drive belt which follows easily the alternating rectilinear motion of the head stock and of the pulley 9 although the latter is free of flanges. Said pulley 9 can have a relatively great diameter whilst the slide-block of the head stock will be relatively narrow in comparison with the known devices of this kind (Fig. 5), this condition being indispensable in order to assure a good pull of the belt and a perfect guiding of the head stock.

On the other hand, the device according to the invention permits the use of an endless drive belt, either braided or of leather with cemented joints, because it affords the possibility of an easy removing of the belt from the lathe and its restoring in place. This can be realized by removing on one hand from the frame the disc 17 together with the other parts of the exterior bearing of the driving shaft 14 and, on the other hand, by removing from the head stock 12 as a whole the bushing 22, the pulley 9 and the ball bearing sets 23, 24, 26, 26', the removing of said parts being enabled by the fact that the diameter of the pulley is smaller than the bore of fitting of the head stock 12. Fig. 3 shows the lathe without the lower bearing 17, the removable bushing 22, the pulley 9 and its sets of ball bearings, said members and parts being supposed removed. Thereupon, the drive belt can be removed from the lathe, either through the circular aperture 18 of the frame or through the bore of the head stock in order to replace it by another one, for instance in case of a tearing. The new belt will be introduced preferably through the bore of the head stock, passed thereafter through the aperture 28 and then put on the pulley 8 through the aperture 18. Finally, the bearing 17 and the bushing 22 are restored in place so that the pulley 9 keyed on said bushing will engage the upper loop of the drive belt.

The embodiment illustrated in the drawings is an application of the device according to the invention to a slicing lathe in which the shaft or spindle 21 of the head stock is tubular in order to permit passage of the bar to be sliced. However, the driving arrangement according to the invention can also be used in other machine tools in which for instance the driven shaft would be solid and mounted together with its pulley in a simple slide or a movable bearing, with or without a removable bearing arranged as illustrated in the drawings.

We do not limit our invention to the structure shown and described, as modifications, within the scope of the appended claims, may be made without departing from the spirit of our invention.

What we claim is:

1. A belt drive device for driving a shaft located in a movable slide-member, in which a drive pulley drives a driven pulley by means of an endless belt the two sections of which pass through a single aperture located in said slide-member, comprising in combination on the slide-member a deflecting pulley having guide flanges and over which passes one of the belt sections, the driven pulley having preferably no guide flanges.

2. A belt drive device for driving a shaft located in a movable slide-member, in which a drive pulley drives a driven pulley by means of an endless belt the two sections of which pass through a single aperture located in said slide-member which is constituted by a movable head stock shiftingly located on the slide bar of a lathe frame, comprising in combination on said slide-member a deflecting pulley having guide flanges and over which passes one of the belt sections, said driven pulley having preferably no guide flanges and being loosely fitted on a bush united with an immovable tubular bushing removably fitted in a bore of said head stock so that it can be axially withdrawn, together with the driven pulley, from said head stock out of its back end, the shaft of said head stock being fitted in said immovable bushing by means of a set of antifriction bearings.

3. A belt drive device for driving a shaft located in a movable slide-member, in which a drive pulley drives a driven pulley by means of an endless belt the two sections of which pass through a single aperture located in said slide-member which is constituted by a movable head stock shiftingly located on the slide bar of a lathe frame, comprising in combination on said slide-member a deflecting pulley having guide flanges and over which passes one of the belt sections, said driven pulley having preferably no guide flanges and being loosely fitted on a bush united with an immovable tubular bushing removably fitted in a bore of said head stock such that it can be axially withdrawn, together with the driven pulley, from said head stock out of its back end, the shaft of said head stock being fitted in said immovable bushing by means of a set of antifriction bearings, said movable head stock being shiftingly located in a slide bar constituted by the bed of said lathe frame, said bed being recessed at its back end in order to permit withdrawal of the movable head stock together with its deflecting pulley.

4. A belt drive device for driving a shaft located in a movable slide-member, in which a drive pulley drives a driven pulley by means of an endless belt the two sections of which pass through a single aperture located in said slide-member which is constituted by a movable head stock shiftingly located on the slide bar of a lathe frame, comprising in combination on said slide-member a deflecting pulley having guide flanges and over which passes one of the belt sections, said driven pulley having preferably no guide flanges and being loosely fitted on a bush united with an immovable tubular bushing removably fitted in a bore of said head stock so that it can be axially withdrawn, together with the driven pulley, from said head stock out of its back end, the shaft of said head stock being fitted in said immovable bushing by means of a set of antifriction bearings, the shaft of said driving pulley being journalled at one of its ends in a bearing removably located in the wall of the base of said frame, said bearing comprising a disc fitted in an aperture arranged in said wall of the frame base and permitting the introduction of said endless drive belt.

JACQUES MANCIA.
GEORGES MÉGEL.